Patented Jan. 7, 1947

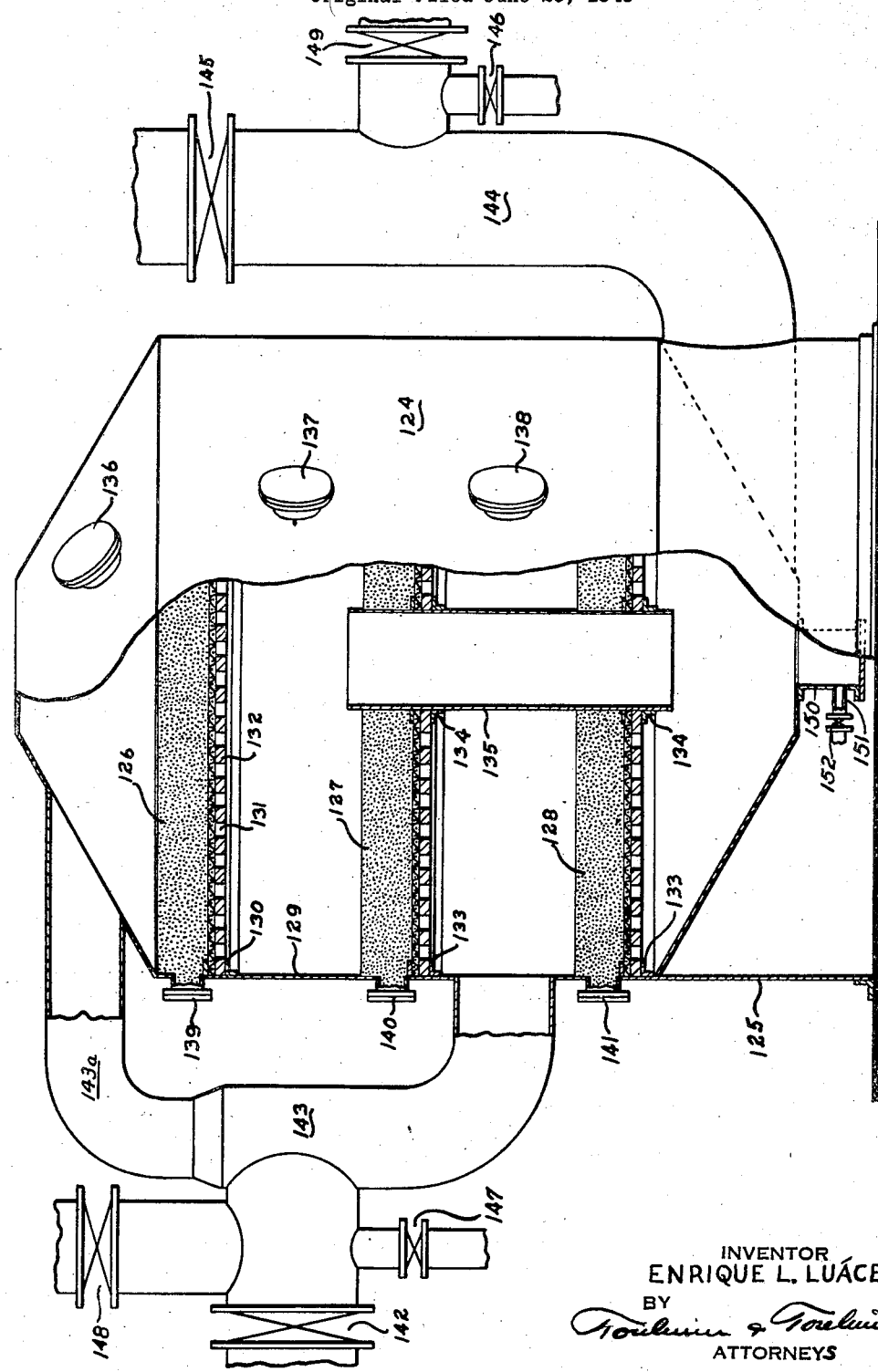

2,413,771

UNITED STATES PATENT OFFICE 2,413,771

ADSORPTION APPARATUS

Enrique L. Luáces, Dayton, Ohio, assignor to Chemical Developments Corporation, Dayton, Ohio, a corporation of Ohio Original application June 25, 1943, Serial No. 492,217. Divided and this application November 1, 1943, Serial No. 508,518

4 Claims. (Cl. 183—4.5)

This application is a division of copending application Serial No. 492,217, filed June 25, 1943.

This invention relates to method and apparatus for treating air, and more particularly deals with adsorption apparatus. More specifically, the invention deals with adsorption apparatus for treating large volumes of air to remove vapors and fumes therefrom, as for example, the volatile solvents employed in connection with the gravure printing inks.

Especially in printing plants, it is necessary that the printing be accomplished at high speeds so that a large volume of solvent is evaporated, and therefore it is necessary to remove large volumes of air from the room in order to maintain the solvent vapor concentration within healthful and safe limits.

Accordingly, it is a primary object of the present invention to provide an adsorption apparatus adapted for handling large volumes of air and in doing so to remove solvent vapors therefrom.

The present invention will be more fully understood from the following description taken in connection with the accompanying drawing which illustrates an adsorber constructed according to the present invention.

Referring to the drawing, there is illustrated an adsorber at 124 which is supported on a skirt 125 and within which there is located a plurality of beds of adsorbent material, as for example, activated carbon. These beds are indicated, respectively, at 126, 127 and 128 and are transversely located in the vertically arranged adsorber shell 129 in vertically spaced relationship whereby the said shell is divided into four separate compartments.

The uppermost of the beds at 126 is supported on the shell 129 by an angle 130 and comprises a foraminous supporting plate 131 and a wire mesh screen 132 resting on the said plate and directly supporting the adsorbent material. The intermediate bed 127 and the lowermost bed 128 are each supported by the angles 133 on the shell 129 and by the angles 134 on the member 135.

The member 135 is a sleeve which traverses the beds 127 and 128 and which connects the space above the former with that below the latter. The sleeve is preferably, but not necessarily, centrally located in the adsorber, passes through the beds in an axial direction and is cylindrical in cross section.

The body of the adsorber is provided with manholes 136, 137, and 138 intended to serve for charging adsorbent to form the beds 126, 127, and 128, respectively, and the manholes 139, 140, and 141 are intended to empty the beds 126, 127, and 128, respectively.

Air to be treated enters the adsorber through valve 142 and header 143 and flows downwardly through beds 126 and 128 and upwardly through bed 127. The portion flowing downwardly through bed 126 and the portion flowing upwardly through bed 127 commingle within the space between these two beds and then flow downwardly through the riser 135 to the bottom of the adsorber. At this point the portion flowing upwardly through bed 127 and the portion flowing downwardly through bed 126 commingle with the portion flowing downwardly through bed 128 and the whole exits through conduit 144 and valve 145.

In order to insure proper division of flow through the legs of the header 143, the upper leg thereof, which carries only one-half the amount of fluid as the lower leg thereof, may be restricted in any suitable and convenient manner, such as by making a portion thereof of a smaller diameter as is indicated in the drawing by the portion bearing the reference numeral 143a.

During the steaming cycle steam enters through valve 146 and flows into the adsorber through conduit 144. One-third of the steam entering the adsorber through conduit 144 will flow upwardly through bed 128 and thence into conduit 143 and two-thirds of the steam entering the adsorber through conduit 144 will flow upwardly through riser 135 into the space between the beds 126 and 127 and half of it will then flow upwardly through bed 126 and into conduit 143 and the other half will flow downwardly through bed 127 into the conduit 143. The distillate will exit from conduit 143 through valve 147.

Any condensation within the adsorber shell during the steaming cycle will flow downwardly by gravity into the condensate chamber 150 which is connected with the said adsorber at the lowermost point in order to receive all of the drainage therefrom. A pipe 151 and a valve 152 are effective to control the withdrawal of condensate from the chamber 150.

During the drying and cooling cycle air will enter through valve 148 and header 143 and will travel through the adsorber in the same manner as the air to be treated travels in the adsorption cycle. The drying and cooling air is exhausted from the adsorber through conduit 144 and valve 149.

Those skilled in the art will understand that while the flow of drying and cooling air has been indicated to be in the same direction as the flow of air to be treated, the apparatus and method of the present invention are not limited in that sense, since the drying and cooling air could be passed through the adsorber countercurrent to the flow of air to be treated with equal satisfaction. Likewise, those skilled in the art will understand that in the case of the adsorber illustrated the flow of steam may be reversed without materially influencing the ultimate results. Generally speaking, it is preferred practice to have the steam flow in a direction opposite to the direction of flow of the air to be treated, but this is not requisite. The direction of flow of each of the fluids passed through an adsorber is influenced primarily by local conditions and individual preference.

It will be understood that while there have been described herein certain specific embodiments of the present invention, it is not intended that this invention be limited to the specific details of construction, and arrangement of parts, herein described or illustrated in the drawing, in view of the fact that this invention is susceptible to modifications according to individual preference and conditions without departing from the spirit of this disclosure and the scope of the appended claims.

I claim:

1. An adsorber comprising a vertically disposed shell or casing, a first bed of adsorbent material lying transversely of the longitudinal axis of said shell or casing and adjacent to but spaced from the upper portion thereof, a second bed of adsorbent material lying transversely of the longitudinal axis of said shell or casing adjacent to but spaced from the lower portion thereof, a third bed of adsorbent material lying transversely of the longitudinal axis of said shell or casing and intermediate said first and second beds, a cylindrical member centrally disposed along the longitudinal axis of said shell or casing traversing said second and third beds and communicating the space above the latter with that below the former, a header external of said shell communicating the uppermost portion of said adsorber with the portion of said adsorber intermediate said second and third beds, means in association with said header permitting the flow of fluid into and out of said header, conduit means connected with the bottom portion of said adsorber adapted to permit the flow of fluid into and out of said adsorber, means for introducing desorption fluid into said conduit means to be passed to said adsorber, means for withdrawing products of desorption from said adsorber via said header, and means for withdrawing condensate from said adsorber, said last mentioned means lying along the lowermost portion of said adsorber.

2. An adsorber comprising a vertical shell having closed ends, three horizontally disposed and vertically spaced beds of adsorbent material within said shell dividing the same into four separate spaces, a hollow member arranged within said shell to traverse the lower two of said beds and to communicate the space above the upper thereof with that below the lower thereof, external header means connected with said shell and communicating the uppermost space therein with the space intermediate the lower two beds, first conduit means including a valve connected with said header for controlling the flow of fluid into and out of the same, a second conduit means connected with said shell below the lowermost bed for permitting the flow of fluid into and out of said adsorber, a third conduit means including a valve connected with said second conduit means for controlling the flow of desorption fluid into said adsorber, a fourth conduit means including a valve connected with said header for controlling the flow of products of desorption from said adsorber, a condensate chamber attached to and in fluid communication with the lowermost portion of said adsorber, and a pipe line including a valve connected with said chamber for permitting the withdrawal therefrom of condensate.

3. An adsorber comprising a vertical shell having closed ends, first, second and third beds of adsorbent lying transversely in said shell and being vertically spaced from the ends thereof and from each other, an imperforate conduit traversing the lower two of said beds and communicating the space between the upper two of said beds with the space below the lowermost thereof, header means externally connected with said shell and communicating the space above the uppermost bed therein with the space below the lower two thereof, means for passing fluid to be treated through said adsorber comprising a first valved conduit for admitting fluid into said adsorber via said header and a second valved conduit connected with the space below the lowermost of the beds for withdrawing the treated fluid from the adsorber, means for passing desorption fluid through said adsorber in a direction opposite to the flow of the fluid being treated comprising a first valved pipe connected with said second conduit for admitting the desorption fluid into said adsorber and a second valved pipe connected with said first conduit for withdrawing the products of desorption from said adsorber, and means for passing cooling and drying fluid through said adsorber in a direction opposite to the passage therethrough of the desorption fluid comprising a third valved conduit connected with said first conduit to admit cooling and drying air into said adsorber and a fourth valved conduit connected with said second conduit to withdraw the cooling and drying air from said adsorber.

4. An adsorber comprising a vertical shell having closed ends, three horizontally disposed and vertically spaced beds of adsorbent material within said shell dividing the same into four separate spaces, an imperforate conduit arranged within said shell and traversing the lower two of said beds to communicate the space above the upper thereof with that below the lower thereof, external header means connected with said shell and having a branch communicating the uppermost space therein with the space intermediate the lower two beds, first conduit means including a valve connected with said header intermediate the ends thereof for controlling the flow of the fluid to be treated into the same, a second conduit connected with said shell below the lowermost bed for permitting the flow of treated fluid out of said adsorber, a third desorption fluid conduit including a valve connected with said second conduit means for controlling the flow of desorption fluid into said adsorber, a fourth conduit including a valve connected with said header for controlling the flow of products of desorption from said adsorber, that branch of the header to the uppermost space having one half the flow capacity of the branch to the intermediate space to equalize the flow through each of the three beds.

E. L. LUÁCES.